ZZZ# UNITED STATES PATENT OFFICE.

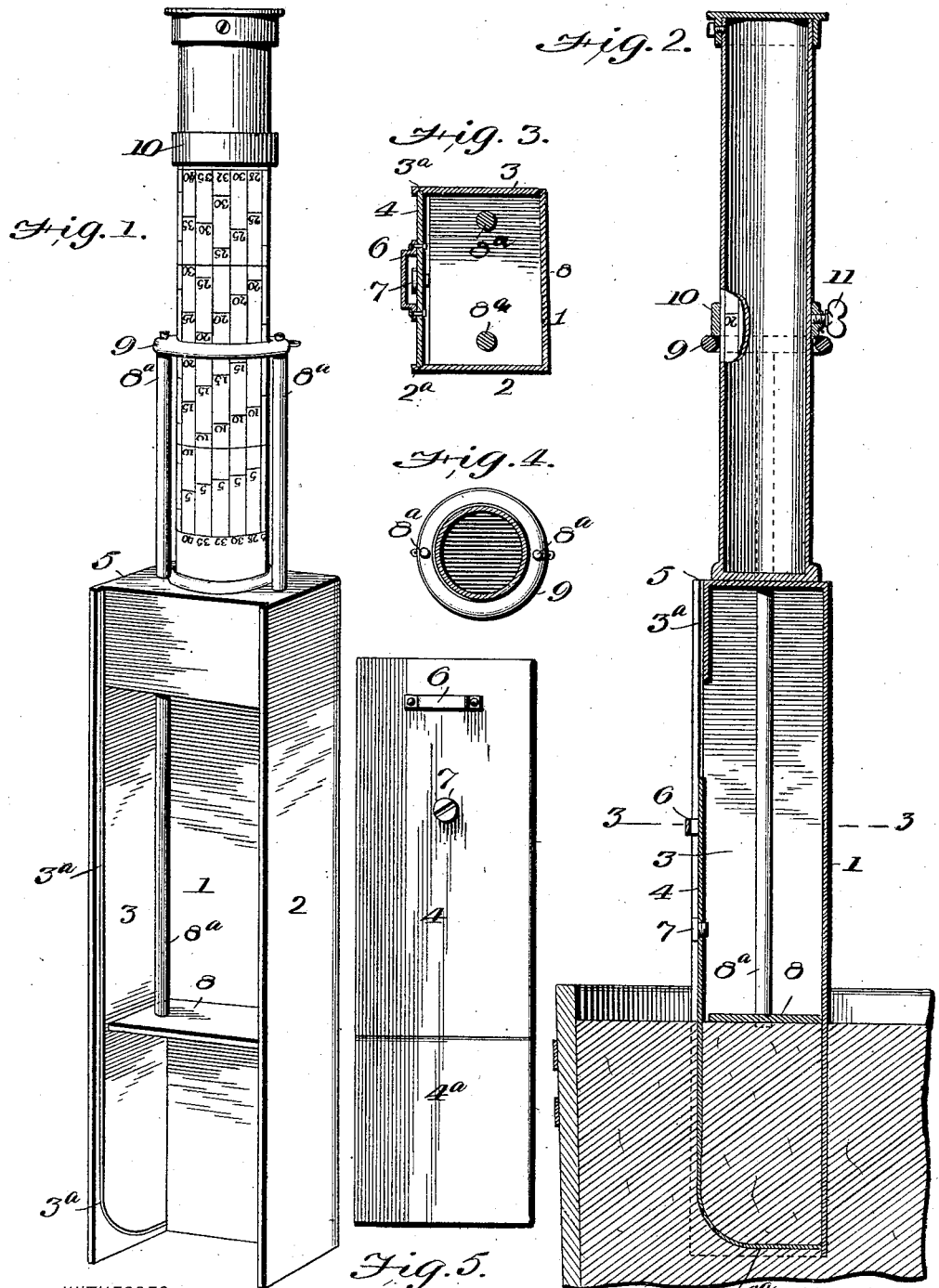

DAVID F. CURTIN, OF ST. LOUIS, MISSOURI.

BUTTER MEASURE AND CUTTER.

No. 870,496.

Specification of Letters Patent.

Patented Nov. 5, 1907.

Application filed March 29, 1907. Serial No. 365,239.

*To all whom it may concern:*

Be it known that I, DAVID F. CURTIN, a citizen of the United States, and a resident of St. Louis, Missouri, have invented certain new and useful Improvements in Butter Measures and Cutters, of which the following is a specification.

My invention relates to improvements in devices for weighing and computing quantities of butter, its object being to produce a device which shall be simple, cheap, and efficient, and one in which any given quantity of butter at a given price will be pressed into shape and cut from the mass of butter.

My invention consists of certain novel features of construction, arrangement and combination of parts as will be hereinafter fully described and pointed out in the claims, reference being had to the accompanying drawing in which Figure 1 is a perspective view of my improvement. Fig. 2 is a vertical sectional view as in use. Fig. 3 is a horizontal section on line 3—3 of Fig. 2. Fig. 4 is a horizontal section of the handle. Fig. 5 is a front elevation of the sliding side which does the cutting.

In carrying out my invention, I use a butter mold consisting of the three rigid sides 1, 2 and 3, the front being left open as shown in Fig. 1. The other side 4 is to slide between the side walls 2 and 3, and acting as a cutter. This is done by providing the side walls 2 and 3 with grooves $2^a$ and $3^a$ which extend downwardly from the top 5 of the mold to near the bottom edge of the side walls, said grooves curving near their lower ends inwardly to the back wall 1 of the mold. As stated the side or wall 4 slides in these grooves $2^a$ and $3^a$, and to accomplish this I propose to make the upper or main portion of said wall 4 rigid while the lower portion $4^a$ is made flexible, the purpose of which will presently appear.

The upper portion of the sliding wall 4 is provided with a thumb hold 6 and below the same, a stop 7 to limit the upward movement of said slide 4.

To the top piece 5 is rigidly secured the tubular handle around which is fixed a computing chart as shown, said chart being placed to read by looking downward from top of handle. The device for expelling butter from the mold consists of a transverse plunger 8 fitted to slide within the mold, having two rods $8^a$, $8^a$ projecting upwardly through the top 5 and secured to a ring 9 surrounding the tubular handle, said rods being secured to the ring 9 at diametrically opposite points. 10 is a clamp ring for limiting the amount of movement of ring 9 and is adjusted up and down the tubular handle by a setscrew 11; said clamp ring passing around the chart as shown.

When a certain quantity of butter either in ounces or money value is wanted, the clamp ring 10 is placed with its lower edge at the line on the chart indicating quantity wanted and is there securely clamped by thumb screw. The device is now ready for use; when it is held in a vertical position the plunger falls to the lower or open end of the device and comes in contact with the butter, the slide 4 being up; as soon as the device is pushed in to the tub the plunger rises with the butter, the ring 9 attached to the rods $8^a$ also rises on the chart until it comes in contact with the clamped ring 10 showing that the correct quantity is then in the mold; the sliding side 4 is now pushed downwardly as far as it will go; this cuts off butter at the lower end of the mold by reason of the flexible lower part of said slide 4 following the curve of the grooves in the side walls of the device. The device is now withdrawn from the butter in tub, the sliding side 4 pulled upwardly until the flexible lower end clears the curved channels; the butter is then pushed out of the device by taking hold of ring 9 and pushing it down as far as it will go, the butter being expelled and the operation completed, and the device ready for use again.

The flexible wall which forms the cutter, it will be noticed does not cut a perfect cube, but rounds off slightly one edge of the piece of butter.

I claim—

1. A combined butter measure and cutter consisting of a handle carrying a computing chart, a mold at the lower end of same, said mold open at its lower end and comprising rigid side and rear walls, and a sliding flexible front wall adapted to cut butter at the lower end of mold.

2. A combined butter measure and cutter consisting of a handle carrying a computing chart, a mold at the lower end of same, said mold open at its lower end and comprising three rigid walls, and a movable flexible wall, the side walls having grooves in which said flexible wall slides, said grooves located near the front edges of the side walls and extending downwardly and curved rearwardly at their lower ends to the rear wall of the mold, a transverse plunger fitted to slide within said mold, guide rods extending upwardly from said plunger through the upper wall of the mold, a ring secured to the upper ends of said guide rods and surrounding the handle and means on the handle for regulating and limiting the upward movement of the ring located at the upper end of the guide rods.

3. A butter mold and cutter consisting of a box open at its lower end and having rigid side and rear walls, a front wall fitted to slide between the side walls and having a flexible portion adapted to be guided across the open lower end of the mold and cut the butter.

4. A butter mold and cutter comprising a box open at its lower end and having rigid side and rear walls and a front slidable wall, said slidable wall fitted in grooves in the side walls, said grooves extending downwardly in a straight line and curving rearwardly to the rear wall of the box at its extreme lower end, said slidable wall having a flexible portion which follows said grooves, said flexible wall serving as a cutter to sever the butter which has been forced into the mold from a bulk.

5. The combined butter computing measure and cutter, consisting of a box having its lower end open and comprising three rigid vertical walls and a top wall, a front wall fitted to slide in grooves formed in the side walls, said grooves extending in a straight line from the upper end of the box to near its lower end where they curve rearwardly to the rear wall and across the extreme lower end of the box, the slidable wall having a flexible portion which follows the said curved grooves and forming a cutter, a stop on said slidable wall to limit its upward movement, a transverse plunger fitted to slide within said box, guide rods extending upwardly from said plunger through the upper wall of the box, a ring secured to the upper ends of the rods and surrounding a handle projecting upwardly from the box, said handle having a computing chart thereon, a stop ring adjustably held on said handle to limit the upward movement of the sliding ring, and means for locking the stop ring on the handle.

DAVID F. CURTIN.

Witnesses:
G. W. DEARING,
MARTIN ERNST.